United States Patent
Kwon

(10) Patent No.: US 10,216,404 B2
(45) Date of Patent: Feb. 26, 2019

(54) METHOD OF SECURING IMAGE DATA AND ELECTRONIC DEVICE ADAPTED TO THE SAME

(71) Applicant: Samsung Electronics Co., Ltd., Gyeonggi-do (KR)

(72) Inventor: Jaehwan Kwon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 209 days.

(21) Appl. No.: 14/857,985

(22) Filed: Sep. 18, 2015

(65) Prior Publication Data

US 2016/0140350 A1    May 19, 2016

(30) Foreign Application Priority Data

Nov. 13, 2014   (KR) .................. 10-2014-0157870

(51) Int. Cl.
- *G06F 21/00* (2013.01)
- *G06F 3/0488* (2013.01)
- *H04N 5/225* (2006.01)
- *G06F 21/62* (2013.01)

(52) U.S. Cl.
CPC ........ *G06F 3/0488* (2013.01); *G06F 21/6209* (2013.01); *H04N 5/225* (2013.01)

(58) Field of Classification Search
CPC .. G06F 21/602; G06F 3/0488; G06F 21/6209; H04N 5/225; G06K 9/00228; G06K 9/00268

See application file for complete search history.

(56) References Cited

U.S. PATENT DOCUMENTS

| | | | | |
|---|---|---|---|---|
| 8,571,273 | B2* | 10/2013 | Li | G06K 9/00281 382/118 |
| 9,037,600 | B1* | 5/2015 | Garrigues | G06F 17/30265 707/769 |
| 9,218,364 | B1* | 12/2015 | Garrigues | G06F 17/30864 |
| 9,354,788 | B2* | 5/2016 | Woo | G06F 3/0484 |
| 2007/0188795 | A1* | 8/2007 | Chishima | G06K 9/00228 358/1.15 |
| 2008/0069449 | A1 | 3/2008 | Cho et al. | |
| 2009/0257589 | A1* | 10/2009 | Yokota | H04N 7/18 380/216 |
| 2009/0310819 | A1* | 12/2009 | Hatano | G06F 21/6245 382/100 |

(Continued)

FOREIGN PATENT DOCUMENTS

KR    10-2008-0026003 A    3/2008

*Primary Examiner* — Don G Zhao
(74) *Attorney, Agent, or Firm* — Cha & Reiter, LLC.

(57) ABSTRACT

An electronic device and method is disclosed herein. The electronic device may include a memory configured to store image data including at least one object, user identification information, and a specific object mapped to the user identification information, and a processor. The processor may execute the method, including extracting an object from the image data, determining whether the extracted object matches the specific object, if the extracted object matches the specific object, encrypting the image data using the user identification information mapped to the specific object as an encryption key, and storing the encrypted image data in the memory.

10 Claims, 14 Drawing Sheets

(56) References Cited

U.S. PATENT DOCUMENTS

| | | | | |
|---|---|---|---|---|
| 2010/0066847 A1* | 3/2010 | Suzuki | .................. | G02B 7/102 |
| | | | | 348/222.1 |
| 2010/0110500 A1* | 5/2010 | Inoue | .................... | G06F 3/1205 |
| | | | | 358/468 |
| 2013/0002892 A1* | 1/2013 | Sako | .................. | H04N 1/00339 |
| | | | | 348/207.99 |
| 2013/0103528 A1* | 4/2013 | Carnevale | .............. | G06Q 30/02 |
| | | | | 705/26.1 |
| 2013/0212377 A1* | 8/2013 | Malek | .................. | H04L 9/3073 |
| | | | | 713/155 |
| 2013/0305059 A1* | 11/2013 | Gormley | ................... | G07F 7/08 |
| | | | | 713/189 |
| 2014/0063280 A1* | 3/2014 | Tokimoto | ........... | G06K 9/00221 |
| | | | | 348/222.1 |
| 2014/0185862 A1* | 7/2014 | Kamath | ............. | G06Q 20/3829 |
| | | | | 382/100 |
| 2015/0106628 A1* | 4/2015 | Holman | ................ | G06F 21/602 |
| | | | | 713/189 |
| 2015/0106947 A1* | 4/2015 | Holman | .................. | G06F 21/62 |
| | | | | 726/26 |
| 2015/0199742 A1* | 7/2015 | Abhyanker | ........ | G06Q 30/0631 |
| | | | | 705/26.7 |
| 2016/0352520 A1* | 12/2016 | Schwach | ............... | H04L 9/3231 |
| 2017/0139911 A1* | 5/2017 | Qiao | ................... | G06F 17/3028 |

\* cited by examiner

METHOD OF SECURING IMAGE DATA AND ELECTRONIC DEVICE ADAPTED TO THE SAME

CLAIM OF PRIORITY

This application claims the benefit under 35 U.S.C. § 119(a) of a Korean patent application filed on Nov. 13, 2014 in the Korean Intellectual Property Office and assigned Serial No. 10-2014-0157870, the entire disclosure of which is hereby incorporated by reference.

BACKGROUND

Various embodiments of the present disclosure relate to a technology that extracts objects included in image data, and encrypts and decrypts corresponding image data through user's identification information corresponding to objects as an encryption key.

TECHNICAL FIELD

As electronic components have developed they have become high in sensitivity, small in size, and light in weight. Electronic devices such as general mobile devices have thus decreased in volume. In accordance with user demand, electronic devices, such as mobile devices, etc., have also been equipped with a variety of functions beyond a mere call function, such as a game function, Internet searching, e-mailing, electronic payment, etc. In addition, mobile devices with a camera module and lens have been released on the market, providing a camera function for capturing images of objects and an image transmission function for transmitting images taken by the camera module to personal computers or other mobile devices.

In recent years, electronic device users have shared image data acquired through their diverse mobile devices with other electronic device users, or have uploaded image data to web servers over networks such as Internet, etc., to share the images with other users.

For example, an electronic device user shares their content such as images, videos, etc. with people through Social Network Service (SNS) such as a mobile message service, etc.

SUMMARY

When electronic device users share image data with other users through other electronic devices or a Social Network service (SNS), etc., information about a specific person's image included in the electronic device user's image data may be disclosed to others regardless of the person's intent. This often causes damage more serious than when the image data is shared openly on the Internet.

Various embodiments of the present disclosure provide a method of encrypting and decrypting image data through a user's identification information corresponding to objects of the image data which are used as an encryption key, and an electronic device supporting the method.

In accordance with an example embodiment of the present disclosure, the present disclosure provides an electronic device including a memory configured to store image data including at least one object, user identification information, and a specific object mapped to the user identification information, and a processor configured to: extract an object from the image data, determine whether the extracted object matches the specific object, if the extracted object matches the specific object, encrypt the image data using the user identification information mapped to the specific object as an encryption key, and store the encrypted image data in the memory.

In accordance with another example embodiment of the present disclosure, the present disclosure provides an electronic device including a memory configured to store encrypted image data, a display, and a processor configured to: compare an encryption key retrieved from the encrypted image data with user identification information of the electronic device, decrypt the encrypted image data when the encryption matches the user identification information, and controlling the display to display the decrypted image data.

In accordance with another example embodiment of the present disclosure, the present disclosure provides a method of securing image data including: retrieving image data and extracting via a processor an object from the image data, determining whether the extracted object matches a specific object mapped to a user identification information and stored in the electronic device, when the extracted object matches the specific object, encrypting the image data using the user identification information as an encryption key, and storing the encrypted image data in a memory.

In accordance with another example embodiment of the present disclosure, the present disclosure provides a method of securing image data including: retrieving encrypted image data, comparing an encryption key retrieved from the encrypted image data with user identification information of the electronic device, and decrypting the encrypted image data when the encryption key retrieved from the encrypted image data matches the user identification information, and displaying the decrypted image data.

BRIEF DESCRIPTION OF THE DRAWINGS

The disclosure will become more apparent from the following detailed description in conjunction with the accompanying drawings, in which.

DETAILED DESCRIPTION

Figure 1:
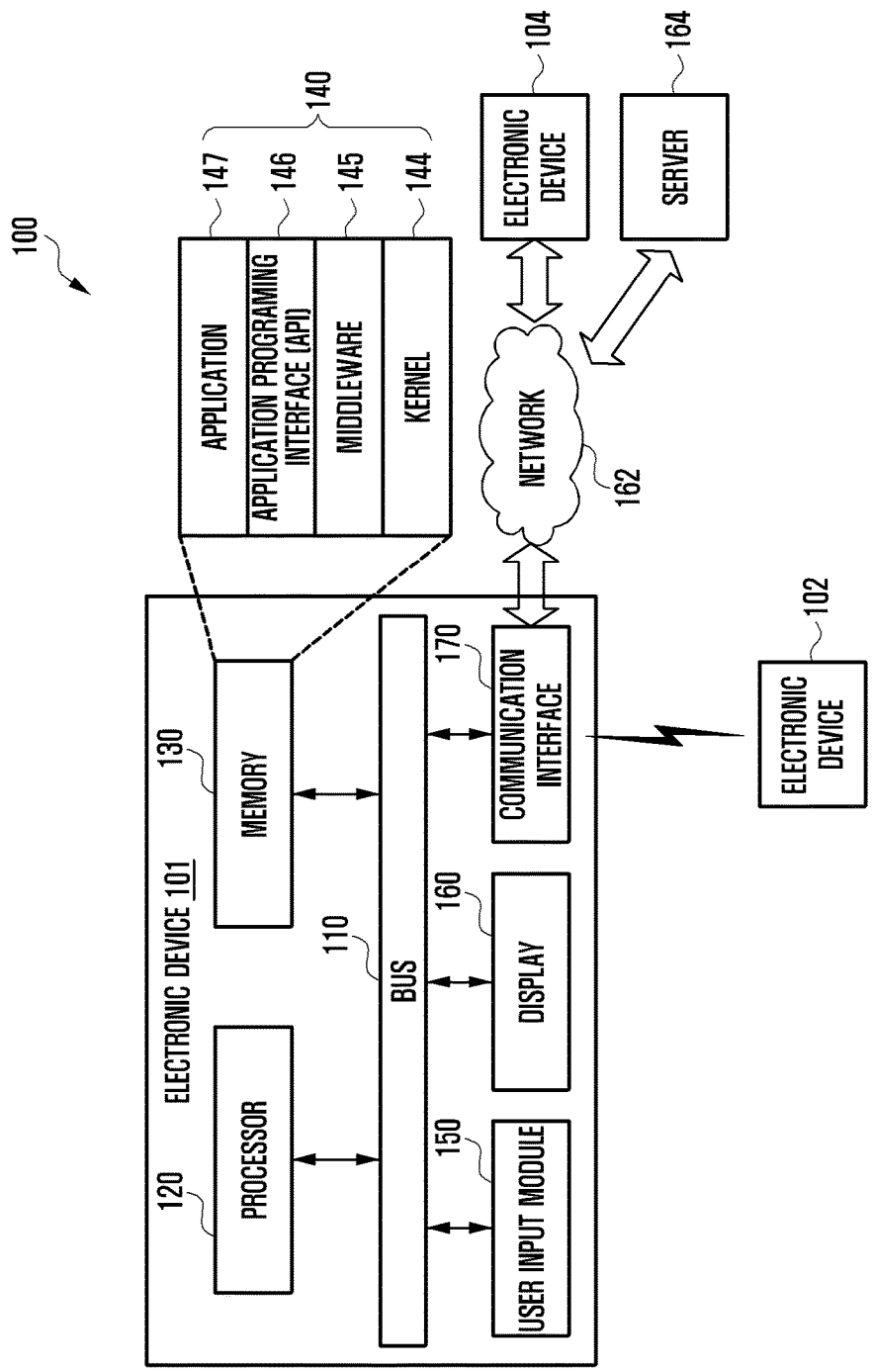
FIG. 1 illustrates a schematic block diagram of a network environment including an electronic device according to an embodiment of the present disclosure.

Hereinafter, example embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, or the like. It is obvious to those skilled in the art that the electronic device according to the present disclosure is not limited to the aforementioned devices.

In the present disclosure, the term an 'image' may include at least one object. An image may be expressed by content or image content including at least one object. Types of object may include people, things, animals, flowers, architectures, sceneries, food, etc., but not limited thereto. Images may include still image such as pictures. Also, images may include images of a unit of frame, extracted from moving image such as videos.

In the present disclosure, the term 'user's identification information' may be unique information for identifying a user of the electronic device 101. For example, the user's identification information may be a resident registration number (or citizen number), an email address, a phone number (e.g., a mobile phone number or a wire telephone number) or biometric information of a user of the electronic device 101. Examples of a user's biometric information are fingerprints, voice patterns, vein patterns, iris patterns, etc.

In the present disclosure, the term a 'specific object' may be an object that has been stored in a memory 130 to be mapped to user's identification information. For example, a specific object may be a person's information that has been mapped to a phone number (user's identification information) and stored in a phone book, an address book, or the like. After a user has stored a specific object to be mapped to the user's identification information, when the user obtains specific image data, a determination may be made as to whether an object extracted from the image data is identical to the specific object.

Hereinafter, electronic devices according various embodiments of the present disclosure may be described in detail with reference to the accompanying drawings. In the description, the term a 'user' is referred to as a person or an apparatus, e.g., an artificial intelligent electronic device that uses an electronic device.

FIG. 1 illustrates a schematic block diagram of a network environment including an electronic device 101 according to an embodiment of the present disclosure.

The electronic device 101 may include a bus 110, a processor 120, a memory 130, an input/output interface 150, a display 160 and a communication interface 170. In an embodiment, the electronic device 101 may omit at least one of the components or may further include at least one component.

The bus 110 may include a circuit that connects the various components 110 to 170 to each other and transmits communication data (e.g., control messages and/or data) between the components.

The processor 120 may include one or more of the following: central processing unit (CPU), application processor (AP), and communication processor (CP). The processor 120 may perform operations or process data, related to the controlling and/or communicating function of at least one of the components in the electronic device 101.

The processor 120 may control the entire operation of the electronic device 101 and also the signals flowing between the components. The processor 120 may also perform a data process function. The processor 120 may control the respective components of the electronic device 101 to support a method of securing image data according to an embodiment of the present disclosure.

The memory 130 may include volatile memory and/or non-volatile memory. The memory 130 may store instructions or data related to at least one of the other components of the electronic device 101. According to an embodiment, the memory 130 may store software and/or program 140. The program 140 may include, for example, a kernel 144, middleware 145, application programming interface (API) 146, and or application program (shortened to "application") 147. At least part of the API 146, middleware 145, or kernel 144 may be called an operating system (OS).

The memory 130 may store instructions or data transferred from the processor 120 or the other components. The memory 130 may store instructions or data created in the processor 120 or the other components. The program 140 may be configured by software, firmware, hardware, or a combination of at least two or more of them.

According to an embodiment, the memory 130 may store at least one item of image data through various configurations and routes. The memory 130 may transfer at least one item of image data to the respective components of the electronic device 101 as the processor 120 makes a call.

The memory 130 may receive and store at least one object (e.g., facial recognition information, etc.) extracted from image data through the respective components of the electronic device 101 under the control of the processor 120. The memory 130 may transfer at least one object to the respective components of the electronic device 101 as the processor 120 makes a call. The memory 130 may also store user's identification information, such as phone numbers, etc., that the user input through the display 160 or the input/output interface 150.

The memory 130 may also store objects and user's identification information (e.g., phone number, etc.) mapped to the objects. For example, a specific person's phone number may be mapped to a person object such as person's image (face) and stored in a database of an application such as PHONE BOOK, etc. In that case, the person's phone number may be user's identification information. The memory 130 may include a variety of applications that may recognize objects (e.g., face information, etc.) from image data. The memory 130 may also receive encrypted image data from the respective components of the electronic device 101 or through a web service and may store the received data.

The kernel 144 may control or manage system resources (e.g., the bus 110, processor 120, memory 130, etc.) used to execute operations or functions of the other programs (e.g. the middleware 145, API 146, and application program 147). The kernel 144 may also provide an interface that may control or manage system resources, allowing the middleware 145, API 146, and application program 147 to access the respective components of the electronic device 101.

The middleware 145 may make it possible for, for example, the API 146 or application program 147 to perform communication of data with the kernel 144. In addition, in relation to task requests transferred from the application program 147, the middleware 145 may also perform a controlling operation (e.g., scheduling or load balancing) with respect to the task requests by using a method such as a method of assigning the order of priority to use system resources of the electronic device 101 (e.g., the bus 110, processor 120, memory 130, etc.) to at least one application of the application program 147, for example.

The application programming interface (API) 146 is an interface that allows, for example, the application 147 to control functions of the kernel 144 or middleware 145. For example, the API 146 may include at least one interface or function (e.g., command) for file control, window control, video process, or character control, etc. In the present disclosure, The API 146 may include routine information for extracting objects included in corresponding image data from image data.

The input/output interface 150 may transfer instructions or data transferred from, for example, a user or other external devices to the other component (components) of the electronic device 101. In addition, the input/output interface 150 may transfer instructions or data transferred from the other component (components) of the electronic device 101 to a user or other external devices.

The input/output interface 150 may receive numerical or alphabetical information. The input/output interface 150 may include a plurality of input keys and function keys to set various types of functions. The function keys may include direction keys, side keys, shortcut keys, etc., which are set to perform specific functions. The input/output interface 150 may receive keys related to a user's settings and function controls of the electronic device 10, create the key signals, and transfer them to the processor 120. The input/output interface 150 may be implemented in touch screen. A touch screen may be formed with a Liquid Crystal Display (LCD), an Organic Light Emitting Diode (OLED), etc. and may be included in the input/output interface 150. For example, the input/output interface 150 may include a panel, sheet, digitizer or the like that may receive general touch inputs, proximity inputs, gesture inputs, inputs by digital pens, etc.

According to various embodiments, the input/output interface 150 may receive an input signal for permitting user authentication of a device and service.

The display 160 may include, for example, Liquid Crystal Display (LCD) module, Light Emitting Diode (LED) display module, Organic Light Emitting Diode (OLED) display module, Microelectomechanical Systems (MEMS) display module or electronic paper display module. The display 160 may display, for example, various contents (e.g., text, images, videos, icons, symbols, etc.) for the user. The display 160 may include a touch screen and may receive touches, gestures, proximity inputs or hovering inputs by using, for example, a digital pen or a part of a user's body.

The display 160 may provide various screens according to the use of the electronic device 101, e.g., screen interfaces related to standby screens, menu screens, call screens, etc. When the display 160 is implemented in touch screen, the screen of the display 160 may serve as the input/output interface 150.

The communication interface 170 may establish communication between, for example, the electronic device 101 and an external device (e.g., a first external electronic device 102, a second external electronic device 104 or a server 164). For example, the communication interface 170 may communicate with the external device (e.g., second external electronic device 104 or server 164) connected to the network 162 in wireless or wired communication mode.

The wireless communication may use at least one of the following: for example, LTE, LTE-A, CDMA, WCDMA, UMTS, Wi-Bro, GSM, etc., as cellular communication protocols, for example. The wired communication may include at least one of the following: for example, universal serial bus (USB), high definition multimedia interface (HDMI), recommended standard 233 (RS-232), plain old telephone service (POTS), etc. The network 162 may include at least one of the following: telecommunication networks, e.g., a computer network (for example, LAN or WAN), or telephone networks.

The communication interface 170 may establish communication with other electronic devices (e.g, external electronic devices) or a server which are connected to the electronic device 101 through the network, and may perform transmission/reception of data. The communication interface 170 may include, for example, a cellular module, a Wi-Fi module, a BT module, a GPS module, an NFC module, a mobile network module, or a radio frequency (RF) module.

The first and second external electronic devices 102 and 104 may each be identical or different in type to or from the electronic device 101. According to an embodiment, the server 164 may include one or more groups of servers. According to various embodiments, part of all of the operations executed in the electronic device 101 may be executed in another electronic device or a plurality of other electronic devices (e.g., electronic devices 102 and 104, server 164). According to an embodiment, when the electronic device 101 needs to perform a function or service automatically or according a request, it does not execute the function or service and may additionally request at least part of the function related the execution from another devices (e.g., electronic devices 102 and 104, server 164). The other electronic devices (e.g., electronic devices 102 and 104, server 164) may execute the requested function or additional function and transmit the executed result to the electronic device 101. The electronic device 101 may process the received result as it received or with additional processes and may provide the requested function or service. To this end, the embodiment may employ, for example, cloud computing, distributed computing, or client-server computing technique.

Figure 2:
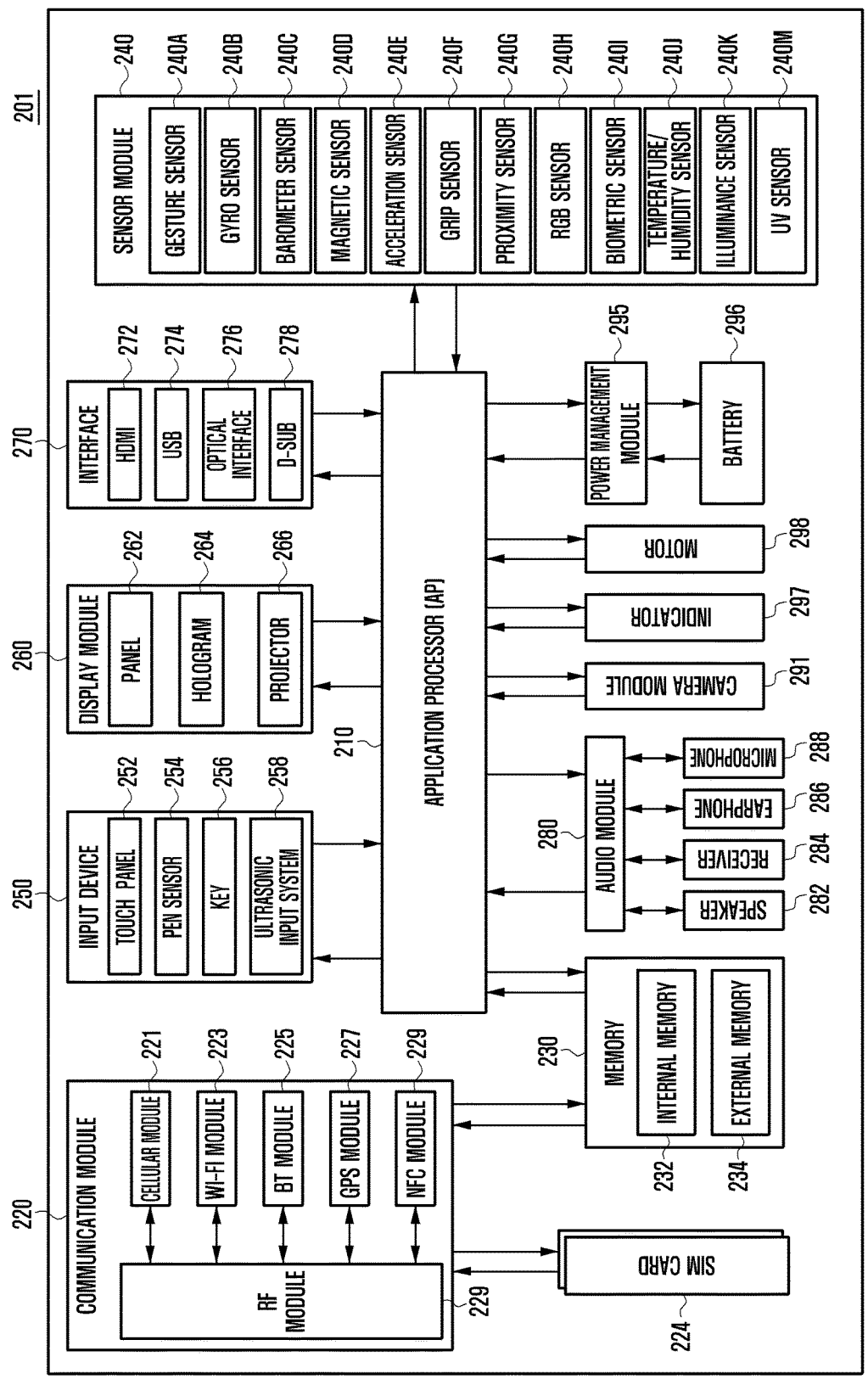
FIG. 2 illustrates a schematic block diagram of an electronic device according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 164) connected to the electronic device 201 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 160) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired or wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
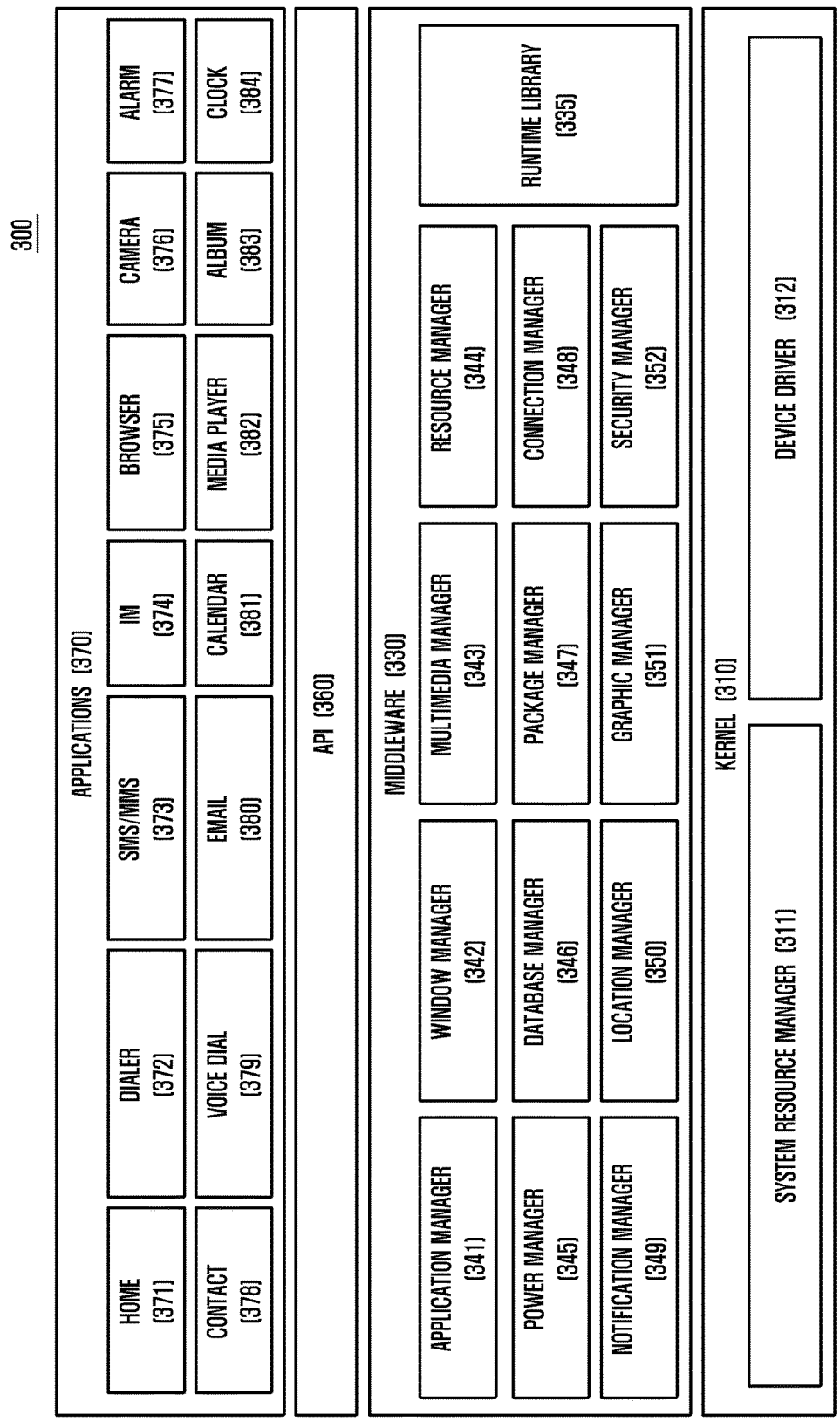
FIG. 3 illustrates a schematic block diagram of a programming module according to various embodiment of the present disclosure.

FIG. 3 is a block diagram illustrating a configuration of a programming module 300 according to an embodiment of the present disclosure.

The programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware, and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 144) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements.

Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Figure 4:
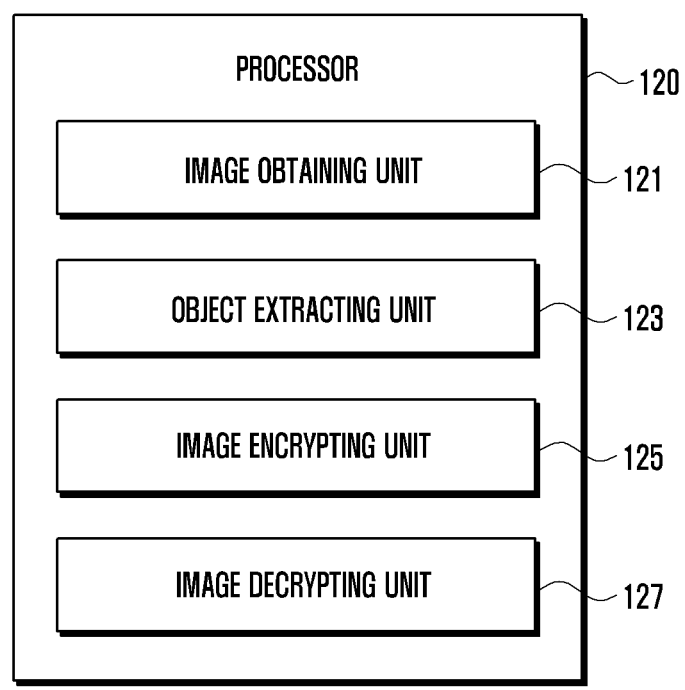
FIG. 4 illustrates a schematic block diagram of the configuration of a processor according to an embodiment of the present disclosure.

FIG. 4 illustrates a schematic block diagram of the configuration of a processor 120 according to an embodiment of the present disclosure. According to an embodiment, the processor 120 may include an image obtaining unit 121, an object extracting unit 123, an image encrypting unit 125 and an image decrypting unit 127. It should be understood that the image obtaining unit 121, the object extracting unit 123, the image encrypting unit 125, and the image decrypting unit 127 may be integrated as one module. It should be understood that, in the present disclosure, the image obtaining unit 121, the object extracting unit 123, the image encrypting unit 125 and the image decrypting unit 127 may also be functionally separated and described.

According to an embodiment, the image obtaining unit 121 may receive image data stored in the memory 130, such as photographs, still images, moving images, etc., from the memory 130. The image obtaining unit 121 may obtain image data through the camera module 291 or the input/output interface 150. In addition, the image obtaining unit 121 may control the communication interface 170 to obtain image data from another electronic device 104 or server 164 though the network 162 or may directly receive image data from another electronic device 102 through the communication interface 170.

According to an embodiment, the image obtaining unit 121 may transfer the image data, obtained from the various configurations described above, to the object extracting unit 123 of the processor 120 or may store the image data in the memory 130.

According to an embodiment, the object extracting unit 123 may extract effective objects from the image data transferred from the image obtaining unit 121 or the memory 130. The objects may include face image that may recognize a specific person, etc. To this end, the object extracting unit 123 may call the API 146 that includes routine information for extracting objects from image data. Algorithms for extracting effective objects from image data may be implemented by well-known various application programs. The present disclosure is not limited to a specific algorithm.

Extracting a face image of an object may include a process of scanning image data and detecting face recognition information from the image data by, for example, the object extracting unit 123. To this end, the object extracting unit 123 may detect various objects included in an image and may extract characteristic values for objects. The characteristic values for objects may be numerical values acquired by using at least one of the following: a facial area extraction technique, a facial recognition technique, an object recognition technique, an outline detection technique, a feature point detection technique or a text recognition technique. These techniques may be fulfilled by modules, programs, routines, sets of instructions or processes, etc. to perform one or more functions.

The object extracting unit 123 may perform a process of extracting a face area and may determine whether a person's face is included in a selected object. When the object extracting unit 123 ascertains that a person's face is included in a selected object, it may perform a face recognition process based on principal component analysis (PCA), and may detect a specific value expressed by a numeral for the face area. The object extracting unit 123 may transfer the detected specific value to the image encrypting unit 125 or the memory 130.

According to an embodiment, the object extracting unit 123 may extract a specific object from images (e.g., a person's image stored in an address book) stored in the memory 130 as well as objects from image data. For example, the object extracting unit 123 may store an image including a specific object, mapping to corresponding user's identification information, in the memory 130, and may extract the specific object from the image if desired. The object extracting unit 123 may transfer the extracted specific object to the image encrypting unit 125. It should be understood that the present disclosure is not limited to the embodiments. The extraction of a specific object may also be performed in the image encrypting unit 125.

According to an embodiment, the image encrypting unit 125 may receive objects from the object extracting unit 123 or the memory 130 and may search for a specific object corresponding to a corresponding object and user's identification information mapped to the specific object in the memory 130. To this end, the electronic device 101 may receive a specific object (e.g., information about a person's photograph, etc.) and user's identification information mapped to the specific object from the user and may store them in the memory 130. In that case, the specific object and the user's identification information mapped to the specific object may be stored in a phone book, an address book, or the like.

According to an embodiment, the image encrypting unit 125 may encrypt corresponding image data through the searched user's identification information as an encryption key. The encryption process may include: designating, for example, image data as original data; and designating user's identification information about an object included in corresponding image data as an encryption key. The image encrypting unit 125 may create encrypted image data from the original image data by using corresponding original data, corresponding encryption key and a hash function. The encrypted image data may be created in the form of compression, such as Joint Photographic coding Experts Group (JPEG), etc., but not limited thereto. For example, encrypted image data may be created as image files in various compression forms.

According to an embodiment, the image encrypting unit 125 may store user's identification information in Exchangeable Image File (EXIF) information about an encrypted image. Encrypted image data may include key information about an encrypted image and additional information related to the image, according to the EXIF policy. The key information may refer to user's identification information. The key information may refer to a phone number of a specific mobile device as an embodiment of the present disclosure. In that case, in order to protect a person's privacy, the user's identification information such as a phone number, etc. may be encrypted and included in the additional information of EXIF so that it cannot be disclosed to a third party. For example, for encrypted image data, options, such as information about a camera device that has taken an image, the image taken date, the image size, etc., and information such as encrypted phone number, etc. may be stored in a specific area of the EXIF.

According to an embodiment, the image encrypting unit 125 may be performed in a method including the user's identification information and the additional information in metadata of an image. For example, the image encrypting unit 125 may tag the input additional information to the image through a method of inserting additional information into the EXIF of an image. EXIF may include date that an image was created, a location where the image was created, the image creator, the image size, operating conditions of a device when the device created the image, etc. When the camera module 291 has created an image, the operating conditions may include exposure time, exposure program, focus length, f-number, shutter speed, flash mode on/off, etc., but this disclosure should be understood as not being limited thereto. In the method of including user's identification information and additional information in metadata of an image, the user's identification information, such as a phone number, etc., may be encrypted and tagged to metadata so that it cannot be disclosed to a third party.

According to an embodiment, the image encrypting unit 125 may store encrypted image data in the memory 130. For example, the image encrypting unit 125 may store encrypted image data in the memory 130 or a cache memory.

According to an embodiment, the image decrypting unit 127 may receive encrypted image data from the memory 130, or encrypted image data from another electronic devices 102 and 104 or the server 164 through the communication interface 170. The electronic device 101 may access a specific web service through a network, etc., and may receive encrypted image data. The encrypted image data may be uploaded to a corresponding server or a web service through other electronic devices 102 and 104 or the electronic device 101 with an encryption function according to the present disclosure.

According to an embodiment, the image decrypting unit 127 may receive encrypted image data from the memory 130 or communication interface 170, and may compare an encryption key (e.g., a user's identification information) included in the encrypted image data with the user's identification information for the electronic device 101.

According to an embodiment, the image decrypting unit 127 may decrypt the encrypted image data of the electronic device 101 by using a hash function, etc. For example, in a state where encrypted image data was encrypted through a phone number of a specific mobile device as an encryption key, when the phone number of the electronic device 101 that has received the encrypted image data is identical to the phone number used for the encryption key, the image decrypting unit 127 may decrypt the encrypted image data to reproduce the original image data. In that case, the image decrypting unit 127 may decrypt the encrypted image data through the phone number of the electronic device 101 utilized an encryption key, transferred or received from the SIM card 224. The image decrypting unit 127 may control: the memory 130 to store the decrypted image data; or the display 160 to display the decrypted image data.

According to an embodiment, the electronic device 101 includes: a memory 130 for storing image data including at least one object, user's identification information, and a specific object mapped to the user's identification information; and a processor 120 for: extracting at least one object included in image data; determining whether the extracted object is identical to (or matches) the specific object; encrypting, when the extracted object is identical to the specific object, the image data through the user's identification information as an encryption key; and storing the encrypted image data in the memory 130.

According to an embodiment, the specific object includes a specific person's face image stored in the memory 130, and the user's identification information includes a phone number that is mapped to the face image and stored in the memory.

According to an embodiment, the processor 120 encrypts the image data to be displayed with mosaics or to show a message window informing that the image is not displayed.

According to an embodiment, the electronic device 101 further includes a display 160. When two or more user's identification information items are mapped to the specific object, the processor 120 receives an input for selecting a specific user's identification information item from the user's identification information items, from a user, through the display 160.

According to an embodiment, the processor 120 receives an input of user's identification information mapped to the specific object, from a user, through the display 160.

According to an embodiment, the electronic device 101 further includes a camera module 291. The processor 120 takes the image data through the camera module 291 and stores the taken image data in the memory 130.

According to an embodiment, the electronic device 101 further includes a communication interface 170. The processor 120 receives the image data from another electronic device or a server through the communication interface 170.

According to an embodiment, the user's identification information is tagged to Exchangeable Image File (EXIF) information about the image data or stored as metadata of the image data.

According to an embodiment, the user's identification information is processed with security and is tagged to Exchangeable Image File (EXIF) information about the image data or stored as metadata of the image data.

According to an embodiment, the electronic device 101 includes: a memory 130 for storing encrypted image data; a display 160 for displaying at least one of the following: the encrypted image data item and a decrypted image data item; and a processor 120 for: comparing an encryption key of the encrypted image data with a user's identification information about the electronic device; decrypting the encrypted image data when an encryption key of the encrypted image data is identical to a user's identification information about the electronic device; and displaying the decrypted result on the display 160.

According to an embodiment, the processor 120 displays the encrypted image data on the display 160 when an encryption key of the encrypted image data is not identical to a user's identification information about the electronic device.

According to an embodiment, the electronic device 101 further includes a Subscriber Identification Module (SIM) card. The encryption key of the encrypted image data is a phone number of the electronic device. The user's identification information is a phone number transferred from the SIM card.

Figure 5:
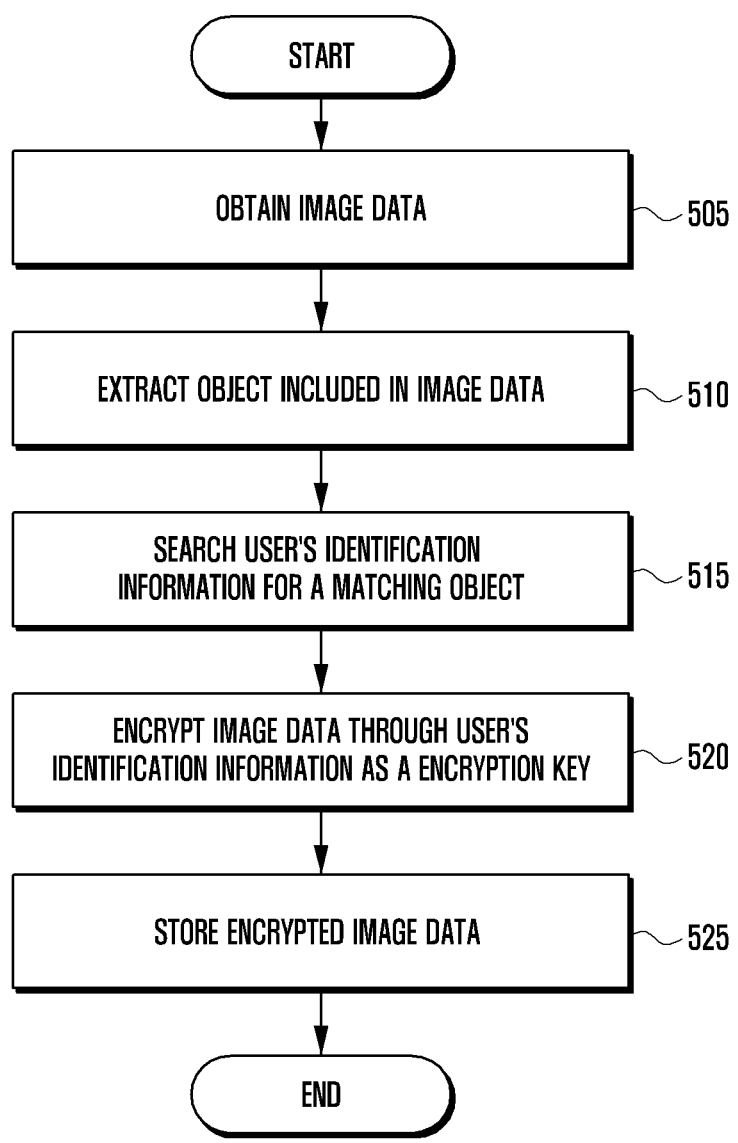
FIG. 5 illustrates a flow chart that describes a method of securing image data according to an embodiment of the present disclosure.

FIG. 5 illustrates a flow chart that describes a process of creating and storing encrypted image data by an electronic device 101 according to an embodiment of the present disclosure.

According to an embodiment, the electronic device 101 may obtain image data (505). For example, the image obtaining unit 121 of the processor 120 may receive image data stored in the memory 130, such as photographs, still images, moving images or video, etc., from the memory 130. The image obtaining unit 121 may obtain image data through the camera module 291 or the input/output interface 150. In addition, the image obtaining unit 121 may control the communication interface 170 to obtain image data from another electronic device 104 or server 164 though the network 162 or may directly receive image data from another electronic device 102 through the communication interface 170.

According to an embodiment, the image obtaining unit 121 of the processor 120 may transfer the image data, obtained from the various configurations described above, to the object extracting unit 123 of the processor 120 or may store the image data in the memory 130.

According to an embodiment, the electronic device 101 may extract objects included in the image data (510). For example, the object extracting unit 123 of the processor 120 may extract effective objects from the image data transferred from the image obtaining unit 121 or the memory 130. To this end, the object extracting unit 123 may call the API 146, which may include routine information for extracting objects from image data. Algorithms for extracting effective objects from image data may be implemented by well-known various application programs. The present disclosure is not limited to any one or combination of specific algorithms.

According to an embodiment, the object extracting unit 123 may transfer objects extracted from the image data to the image encrypting unit 125 or may store the objects in the memory 130.

According to an embodiment, the electronic device 101 may search for user's identification information based on a specific object matching an extracted object from the image data (515). For example, the electronic device 101 may determine whether a specific object mapping user's identification information stored in the memory 130 is identical to the extracted object (or matches the extracted object to a defined degree). To this end, the image encrypting unit 125 of the processor 120 may receive objects from the object extracting unit 123 or the memory 130 and may search for a specific object corresponding to user's identification information mapped to the specific object stored in the memory 130. To this end, the electronic device 101 may receive a specific object (e.g., information about a person's photograph, etc.) and user's identification information mapped to the specific object from the user, and may store them in the memory 130.

When the user's identification information is biometric information such as fingerprints, irises, etc., the processor 120 may control various modules (e.g., the input/output interface 150, camera module 291, display 160 or sensor module 240), receive the biometric information from the user, and store the received biometric information as user's identification information, mapped to a corresponding specific object, in the memory 130.

According to an embodiment, the user's identification information may be phone numbers stored in phone book or contact list. For example, the electronic device 101 may search a database implementing the phone book allocated to the memory 130 for a phone number mapped to a specific object (e.g., a face image, etc.). In that case, although a phone number used in the process of encrypting image data may be detected from the DB of the phonebook, a phone number used in the process of decrypting image data may be received (or retrieved from) from the SIM card 224. The process of calling a phone number from the SIM card 224 will be described in detail later during the description of an image decrypting process referring to FIG. 11.

According to an embodiment, the electronic device 101 may encrypt image data through a user's identification information as an encryption key (520). For example, the image encrypting unit 125 of the processor 120 may encrypt corresponding image data through the searched user's identification information as an encryption key. The encryption process may include: designating, for example, image data as original data; and designating user's identification information about an object (e.g., a face image, etc.) included in corresponding image data as an encryption key. The image encrypting unit 125 may create encrypted image data from the original image data by using corresponding original data, corresponding encryption key and a hash function. The encrypted image data may be created in the form of compression, such as Joint Photographic coding Experts Group (JPEG), etc., but not limited thereto. For example, encrypted image data may be created as image files in various compression forms.

According to an embodiment, the electronic device 101 may store the user's identification information in Exchangeable Image File (EXIF) of an encrypted image. Encrypted image data may include key information about an encrypted image and additional information related to the image, according to the EXIF policy. The key information may refer to a user's identification information. The key information may refer to a phone number of a specific mobile device as an embodiment of the present disclosure. In that case, in order to protect a person's privacy, the user's identification information (such as a phone number, etc.) may be encrypted and included in the additional information of EXIF so that it cannot be disclosed to a third party. For example, for encrypted image data, options, such as information about a camera device that has taken an image, the image taken date, the image size, etc., and information such as encrypted phone number, etc. may be stored in a specific area of the EXIF.

According to an embodiment, the electronic device 101 may execute a method of including the user's identification information and the additional information in metadata of an image. For example, the electronic device 101 may tag the received additional information to the image through a method of inserting additional information into the EXIF of an image. EXIF may include a date that the image was created, a location where the image was created, the image creator, the image size, operating conditions of a device when the device created the image, etc. When the camera module 291 has created the image, the operating conditions may include exposure time, exposure program, focus length, f-number, shutter speed, flash mode on/off, etc., but not limited thereto. In the method of including user's identification information and additional information in metadata of an image, the user's identification information, such as a phone number, etc., may be encrypted and tagged to metadata so that it cannot be disclosed to a third party.

According to an embodiment, the electronic device 101 may store the encrypted image data in the memory 130 (525). For example, the image encrypting unit 125 of the processor 120 may store encrypted image data in the memory 130 or a cache memory.

Figure 6:
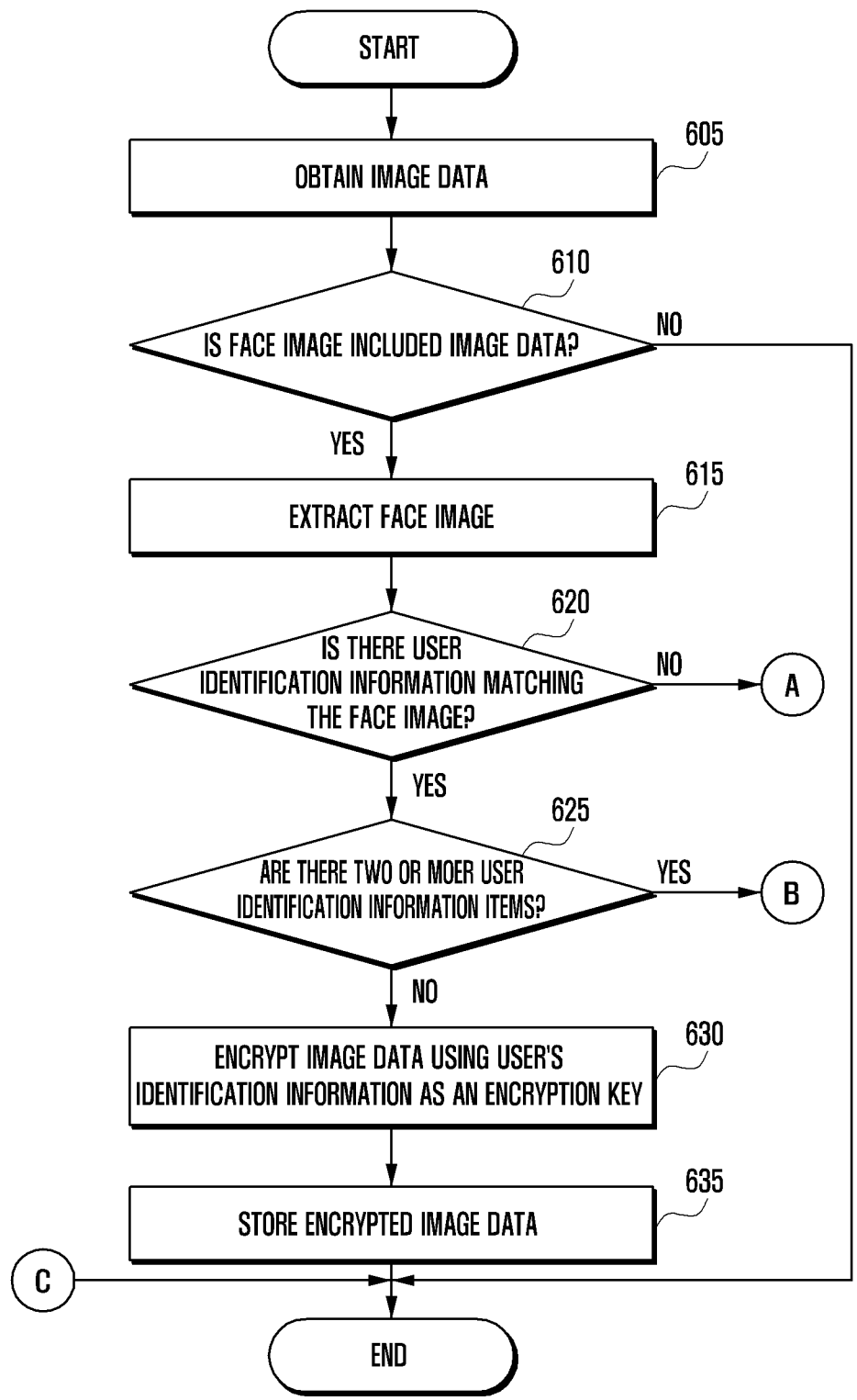
FIG. 6 illustrates a flow chart that describes a process of creating and storing encrypted image data by an electronic device according to an embodiment of the present disclosure.

FIG. 6 illustrates a detailed flow chart that describes a process of creating and storing encrypted image data by an electronic device 101 according to an embodiment of the present disclosure. In the following description, the repetition of the processes described in the embodiment of FIG. 5 will be skipped. A facial or "face" image will be utilized as an object included in image data for this embodiment.

According to an embodiment, the electronic device 101 may obtain image data (605). For example, the image obtaining unit 121 of the processor 120 may receive image data stored in the memory 130, such as photographs, still images, moving images, etc., from the memory 130.

According to an embodiment, the electronic device 101 may determine whether a a face or facial image is included in image data (610). For example, the object extracting unit 123 of the processor 120 may scan image data and execute a facial recognition function on the image data.

When the object extracting unit 123 ascertains that an object is included in corresponding image data in operation 610, it may extract the object from the image data (615). More specifically, the object extracting unit 123 may detect various objects included in the image and may extract characteristic values for the objects. The characteristic values for the objects may be numerical values acquired by using at least one of the following: a facial area extraction technique, a facial recognition technique, an object recognition technique, an outline detection technique, a feature point detection technique and a text recognition technique. These techniques may be fulfilled by modules, programs, routines, sets of instructions or processes, etc. configured to perform one or more functions.

The object extracting unit 123 may perform a process of extracting a face area and may determine whether a face image is included in a selected object. When the object extracting unit 123 ascertains that a face image is included in a selected object, it may perform a facial recognition process based on, for example, principal component analysis (PCA), and may detect a specific value expressed by a numeral for the face area. The object extracting unit 123 may transfer the detected specific value to the image encrypting unit 125 or the memory 130.

When a face image is not included in image data in operation 610, the electronic device 101 may terminate the procedure or may display the obtained image data through the display 160.

According to an embodiment, the electronic device 101 may determine whether contact information corresponding to the face image is stored in the memory 130 (620). For example, the image encrypting unit 125 of the processor 120 may receive the face image detected from corresponding image data from the object extracting unit 123 or the memory 130 and may search the memory 130 for contact information corresponding to the face image. The contact information may refer to a specific object stored in the memory 130.

The case where a contact mapped to the face image is not stored in the memory 130 in operation 620 will be described later referring to FIG. 7.

When the electronic device 101 ascertains that contact information corresponding to the face image is stored in the memory 130 in operation 620, it may determine whether the number of items of user's identification information mapped to the contact information is two or more (625). Contact information and use identification information mapped to the person's information, etc., may be allocated to application memory such as a phone book, an address book, etc. That is, "two or more" may indicate that two or more numbers related to the contact information have been stored in, for example, a phonebook. The case where the number of items of user's identification information mapped to a person's information is two or more will be described later referring to FIG. 9.

According to an embodiment, when the electronic device 101 ascertains that the number of items of user's identification information mapped to the person's information is one in operation 625, it may encrypt corresponding image data through the user's identification information as an encryption key (630). For example, the image encrypting unit 125 of the processor 120 may encrypt a corresponding image data from the searched user's identification information as an encryption key. The encryption process may include: designating, for example, the image data as original data, and designating user identification information of a face image included in corresponding image data as an encryption key. The image encrypting unit 125 may create encrypted image data from the original image data by using corresponding original data, corresponding encryption key and a hash function.

According to an embodiment, the electronic device 101 may store encrypted image data in the memory 130 (635). For example, the image encrypting unit 125 of the processor 120 may store encrypted image data in the memory 130 or a cache memory.

Figure 7:
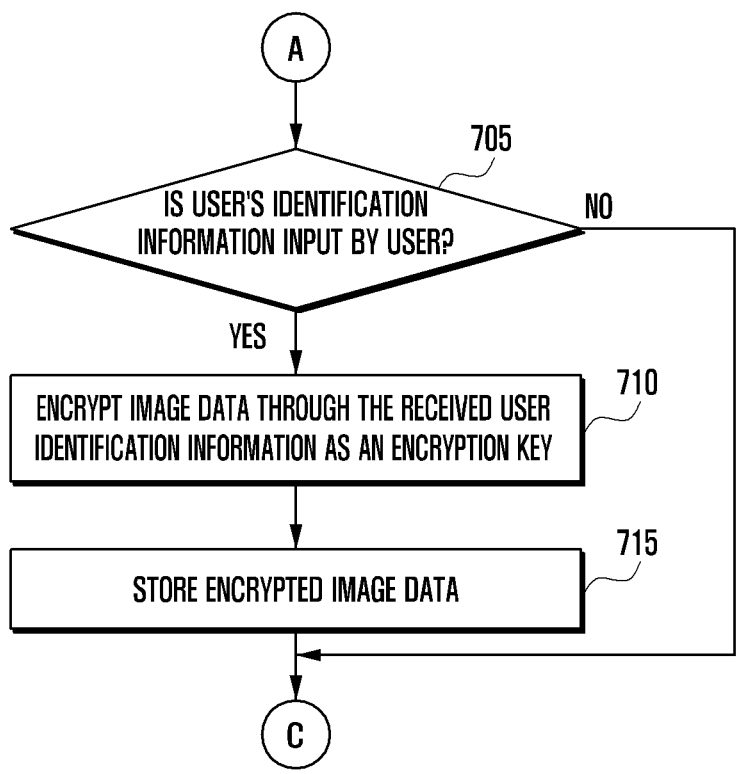
FIG. 7 illustrates a flow chart that describes a process of receiving user's identification information mapped to an object from a user by an electronic device according to an embodiment of the present disclosure.

FIG. 7 illustrates a flow chart that describes a process of receiving user identification information mapped to an object from a user by an electronic device 101 according to an embodiment of the present disclosure.

When the electronic device 101 ascertains that a person's information (a specific object) mapped to the face image does not exist in operation 620 of FIG. 6, it may determine whether it receives user identification information from the user (705). For example, although the obtained image data includes an object (e.g., a face image), a case may occur where the person's information (e.g., a specific object) corresponding to the object (such as the face image) has not been stored in the electronic device 101, even though the user of the electronic device 101 knows the necessary user identification information (e.g., a phone number, etc.) for the contact information. In that case, the image encrypting unit 125 of the processor 120 may control the display 160 to display user an identification information input window configured to receive user identification information corresponding to the object directly from the user. The user identification information may be, for example, a phone number input by a user into the information input window.

According to an embodiment, when the electronic device 101 does not receive user identification information from the user in operation 705, it may terminate the procedure.

According to an embodiment, when the electronic device 101 receives user identification information from the user in operation 705, it may encrypt image data through the received user identification information as an encryption key (710). After that, the electronic device 101 may store the encrypted image data in the memory 130, etc. (715).

Figure 8:
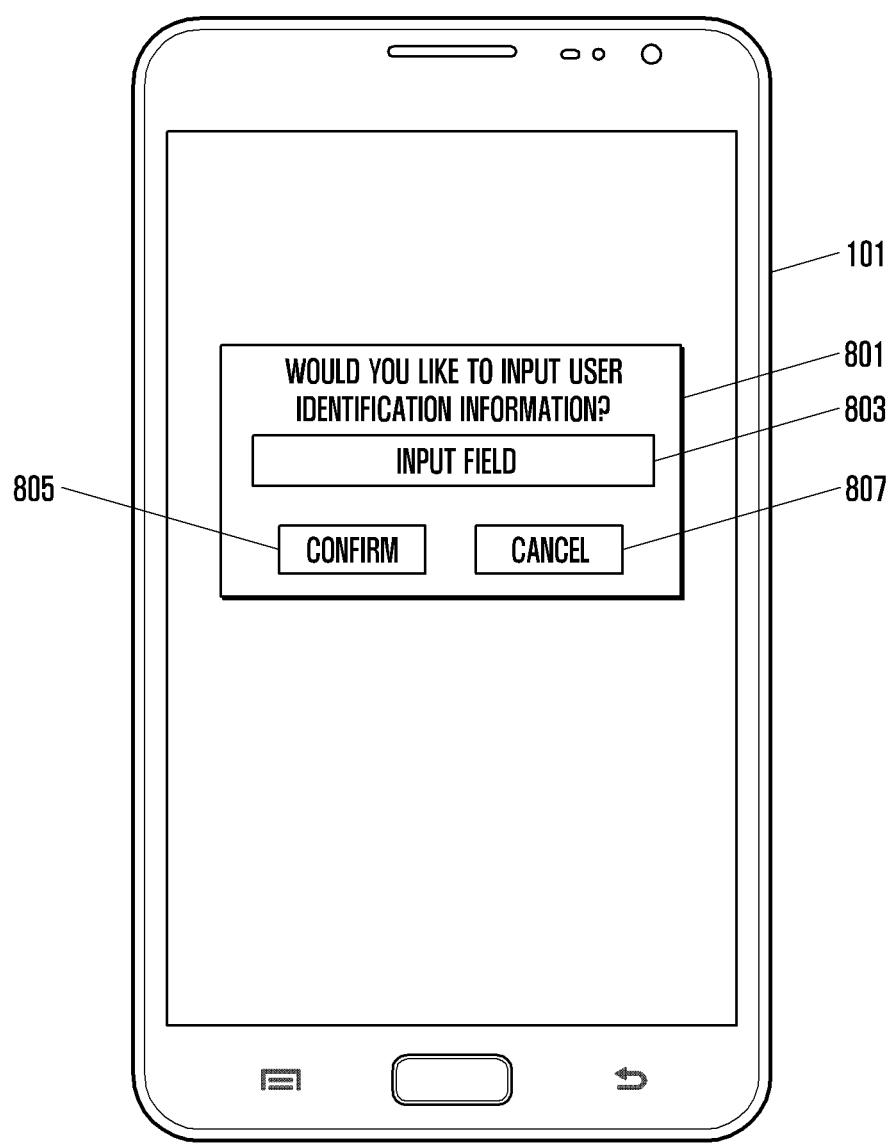
FIG. 8 is a view of an example implemented by the process shown in FIG. 7.

FIG. 8 is a view of an example implemented by the process shown in FIG. 7.

As shown in FIG. 8, when the electronic device 101 does not have a person's information corresponding to the extracted object, it may display a user identification information inputting window 801. The user identification information inputting window 801 may include an input field 803 configured to receive, for example, a phone number as an encryption key, and may further include a a "confirm" icon 805 and a "cancel" icon 807.

When the user enters a phone number corresponding to an object in the input field 803, and clicks the confirm icon 805, the electronic device 101 may encrypt corresponding image data through the received phone number as an encryption key. When the user clicks the cancel icon 807, the electronic device 101 may terminate the encryption procedure.

Figure 9:
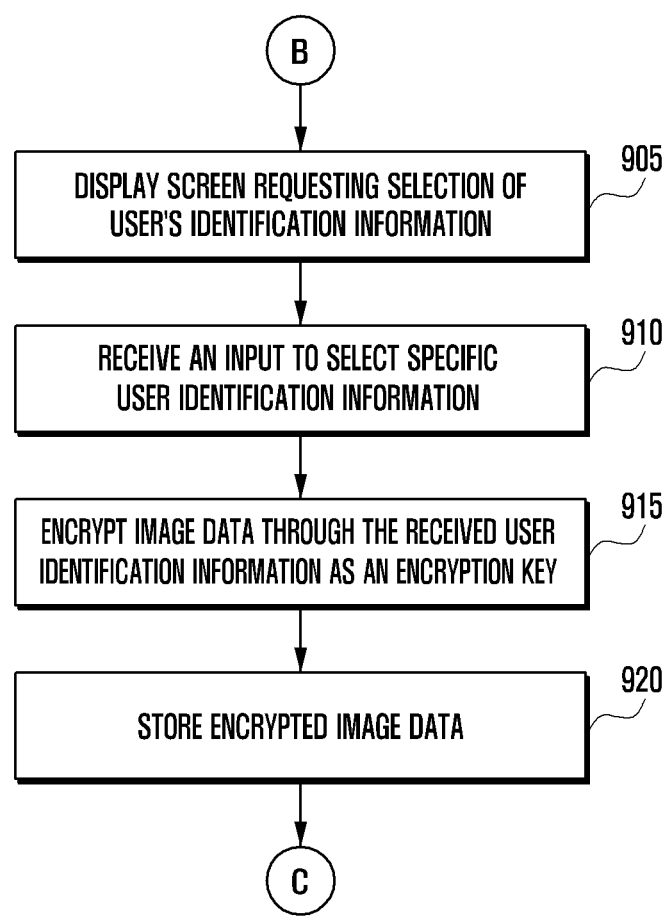
FIG. 9 illustrates a flow chart that describes a process of receiving, when the number of user's identification information items mapped to a specific object is two or more, one of the user's identification information items, according to a user's selection, by an electronic device according to an embodiment of the present disclosure.

FIG. 9 illustrates a flow chart that describes a process of receiving, when the number of user identification information items mapped to a specific object is two or more, one of the user identification information items, according to a selection received from a user, by an electronic device according to an embodiment of the present disclosure.

When the electronic device 101 ascertains that the number of user identification information items mapped to a particular contact information is two or more in operation 625 of FIG. 6, the electronic device 101 may display a screen requesting the selection of user identification information (905). For example, the image encrypting unit 125 of the processor 120 may receive specific user identification information item of the user identification information items in order to set an encryption key to be used to encrypt corresponding image data. To this end, the image encrypting unit 125 may control the display 160 to display a user's identification information selection window.

According to another embodiment, when the electronic device 101 ascertains that the number of user identification information items for a specific object (a person's information) is two or more, it may encrypt image data by using all of the received user identification information items as encryption keys. In that case, the electronic device 101 may encrypt image data so that the encrypted image data can be decrypted if any one of the user's identification information items is identical to the encryption key.

According to an embodiment, the electronic device 101 may receive a user input for selecting a specific user's identification information item (910). For example, the image encrypting unit 125 may receive a user's input for selecting a specific user identification information item through the display 160.

According to an embodiment, the electronic device 101 may encrypt image data through the received user identification information as an encryption key (915).

According to an embodiment, the electronic device 101 may store encrypted image data in the memory 130 or a cache memory (920).

Figure 10A:
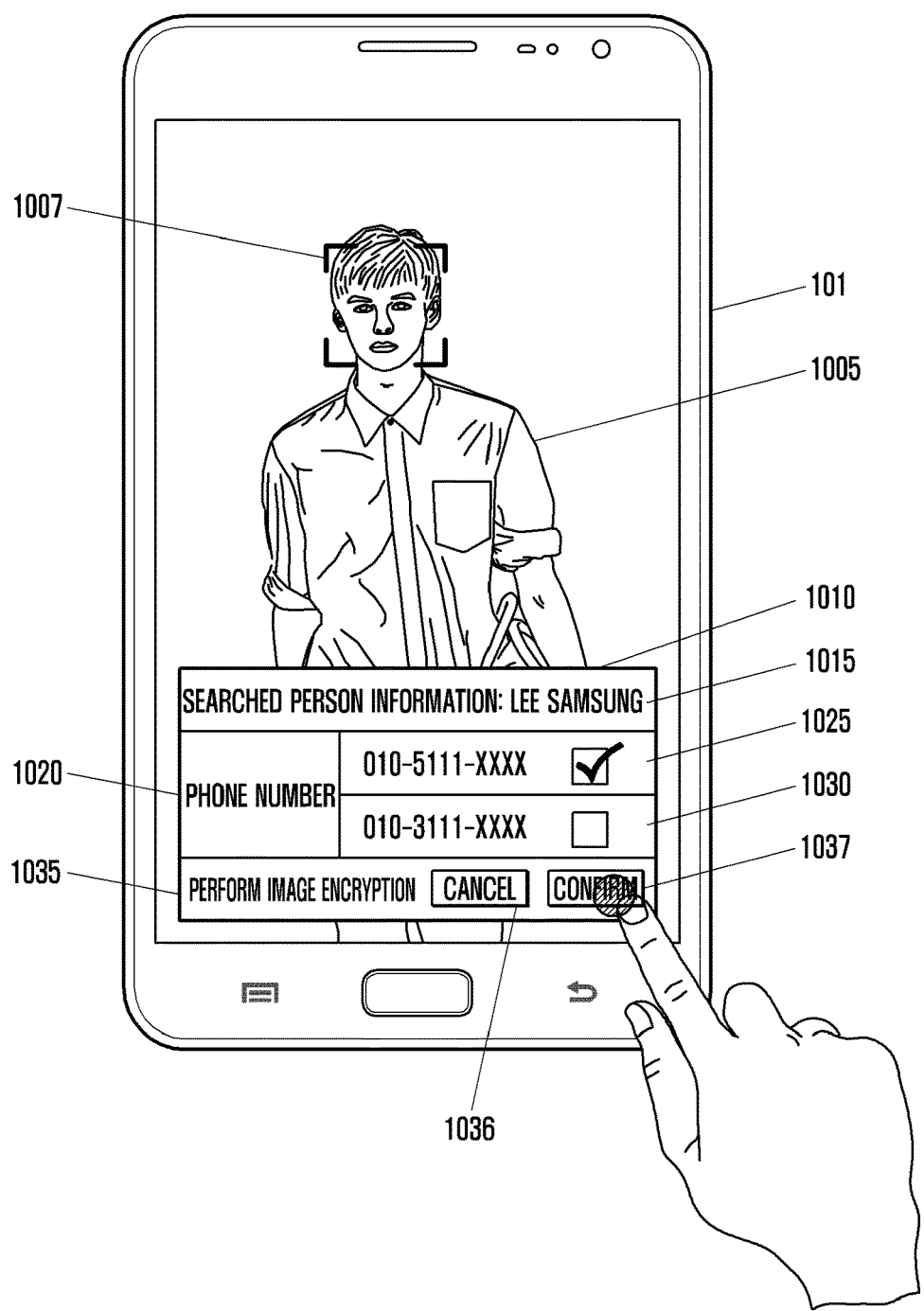
FIG. 10A and FIG. 10B are views of an example implemented by the process shown in FIG. 9.
Figure 10B:
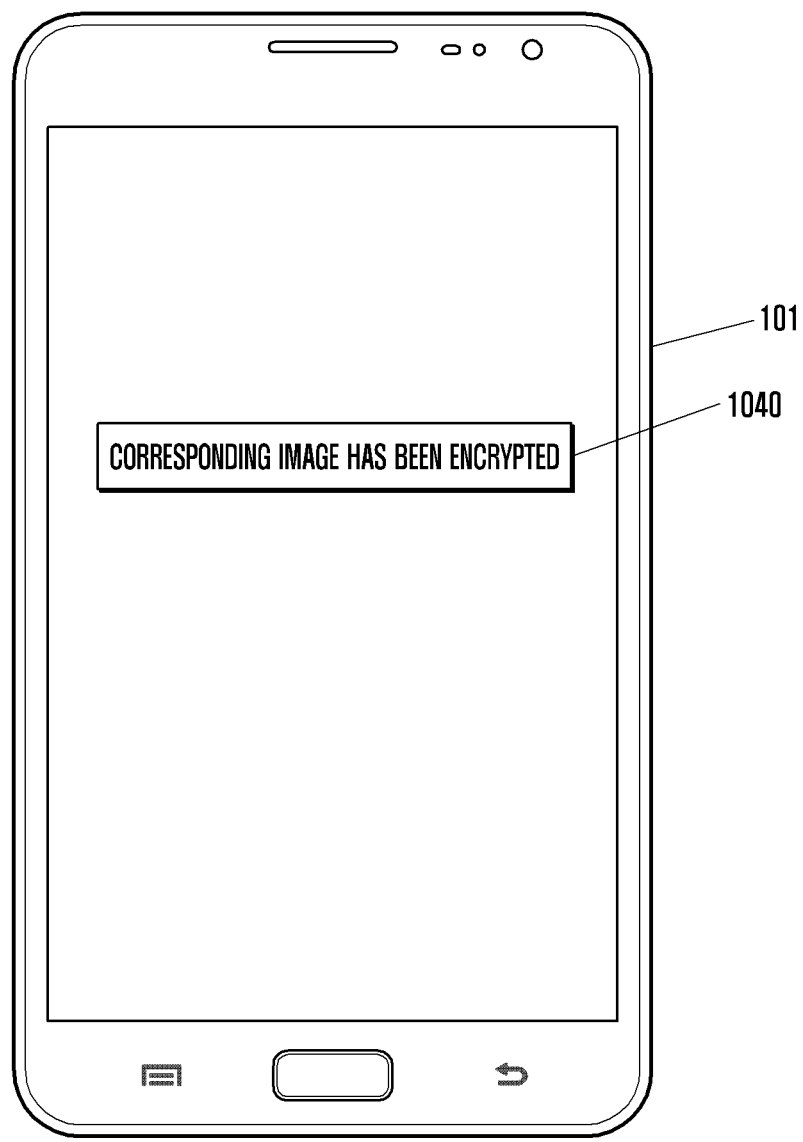

FIGS. 10A and 10B are views of an example implemented by the process shown in FIG. 9.

As shown in FIG. 10A, the electronic device 101 may display a specific image 1005 on the display 160. The electronic device 101 may receive the specific image 1005 through the camera module 291 or the memory 130. The electronic device 101 may receive the specific image 1005 from another electronic devices 102 and 104 or the server 164 through the communication interface 170. The electronic device 101 may extract an object such as a face image from the specific image 1005 displayed on the display 160. Although not shown, in order to execute the encryption procedure of the embodiments of FIG. 9 or FIG. 10, the electronic device 101 may execute a specific application, or may execute an object extracting process in response to a received input, such as detecting a selection of a specific key input, etc.

If an object of the specific image 1005 is extracted, the electronic device 101 may display an indicator 1007 indicating that the object has been recognized or extracted. For example, the object extracting unit 123 of the processor 120 may control the display 160 to display visual brackets indicating that a corresponding object of a specific image 1005 has been extracted.

If the object of a specific image 1005 is extracted, the electronic device 101 may search the memory 130 for a specific object matching a corresponding object. The electronic device 101 may search the memory 130 for user identification information mapped to the searched specific object.

According to an embodiment, when two or more user identification information items are mapped to a specific object, the electronic device 101 may display the user identification information items mapped to a specific object. As shown in FIG. 10A, the electronic device 101 may display a specific image 1005, and additionally an object window 1010 on a bottom portion of the screen, which may include display of a contact information related to the specific object such as a phone number (i.e., user identification information) and a screen querying whether to image encryption should be performed.

More specifically, the electronic device 101 may display information (e.g., a person's name, such as "LEE SAMSUNG") for a specific object matching an object extracted from a specific image 1005 on the "person search" window 1015. Although not shown, the electronic device 101 may also display a screen for searching for contact information including an image as a specific object, which correspond to "LEE 'SAMGSUNG.'" Two phone numbers mapped to the contact information 'LEE SAMSUMG' as user identification information are searched for and displayed on a first user identification information window 1025 and a second user identification information window 1030, respectively. The first user identification information window 1025 and second user identification information window 1030 may each include check box icons, respectively. The check box icons are configured to receive a user's input to indicating that the user identification information is to be used as an encryption key for encrypting the image data 1005 currently displayed. When the user selects the check box icon corresponding to the first user identification information window 1025, and applies an input to the confirmation icon 1037 included in the image encryption window 1035, the electronic device 101 may execute encryption for the specific image 1005, using the first user identification information (e.g., "010-5111-XXXX") as an encryption key. When the user applies an input to the cancel icon 1036, the electronic device 101 may terminate performance of the encryption.

FIG. 10B is a screen displaying a state where the electronic device 101 has encrypted the specific image 1005 using the first user identification information (e.g., "010-5111-XXXX" from FIG. 10A) as an encryption key, in response to the user' input to the confirmation icon 1037 of the image encryption window 1035, as shown in FIG. 10A. In that case, the electronic device 101 may display on the display 160a notification window 1040 indicating that a corresponding image has been encrypted. Although not shown, the electronic device 101 may additionally display information regarding a type of user identification information utilized as an encryption key on the screen shown in FIG. 10B.

Figure 11:
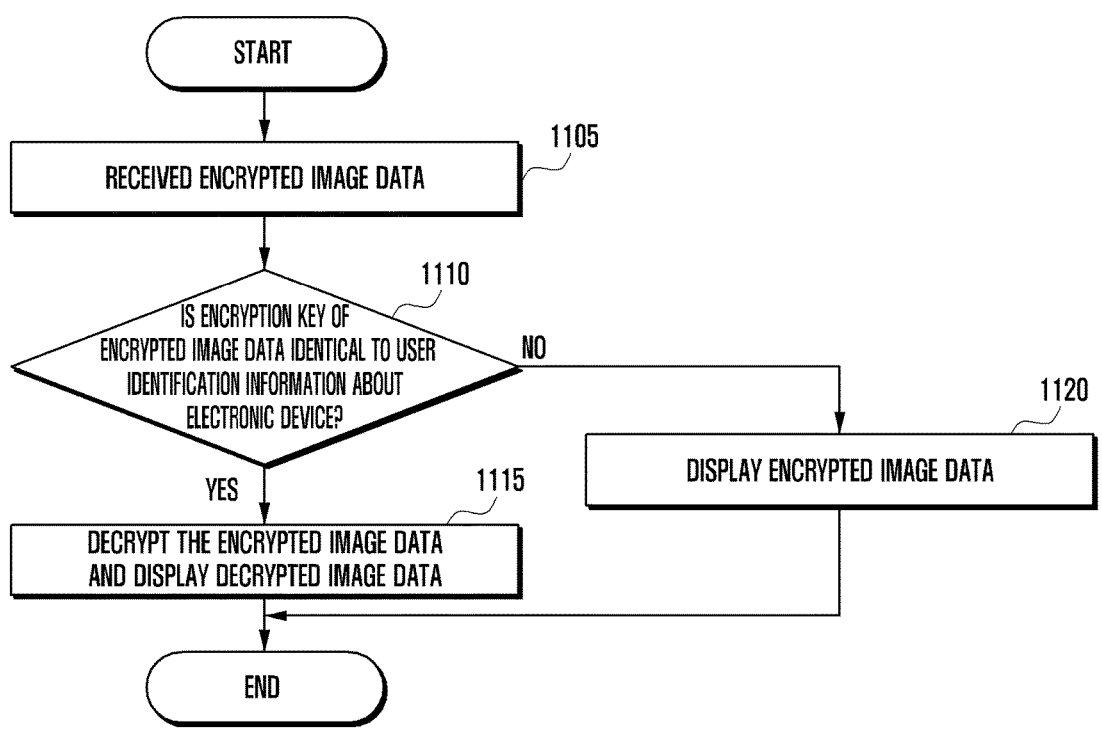
FIG. 11 illustrates a flow chart that describes a process of processing encrypted image data based on user's identification information by an electronic device according to an embodiment of the present disclosure.

FIG. 11 illustrates a flow chart that describes a process of processing encrypted image data based on user's identification information by an electronic device 101 according to an embodiment of the present disclosure.

According to an embodiment, the electronic device 101 may receive encrypted image data (1105). For example, the image decrypting unit 127 of the processor 120 may receive encrypted image data from the memory 130, from another device such as electronic devices 102 and 104, or from the server 164 through the communication interface 170. For example, the electronic device 101 may access a specific web service through a network, etc., and may receive encrypted image data. The encrypted image data may have been uploaded to a corresponding server or a web service through other electronic devices 102 and 104 or the electronic device 101 with an encryption function according to the present disclosure.

According to an embodiment, the electronic device 101 may determine whether user identification information of the encrypted image data is identical to the user identification information of the electronic device 101 (1110). For example, the image decrypting unit 127 may receive encrypted image data from the memory 130 or communication interface 170, and may compare corresponding encrypted image data with user identification information of the electronic device 101.

According to an embodiment, user identification information may be, for example, Subscriber Identity Module (SIM) information stored in a SIM card 224 of the electronic device 101. The SIM information may include subscriber information and authentication information for communication of the electronic device 101, use history related to wireless communication, etc. According to one embodiment, the SIM information may include a phone number of a specific mobile device used to encrypt image data. In that case, the phone number of the specific mobile device, used as an encryption key for the encryption, may be included, in an encrypted form, in the EXIF of the encrypted image data. The electronic device 101 may extract the phone number included in the EXIF of the encrypted image data, receive the phone number of the electronic device 101 from the SIM card 224, and determine whether the extracted phone number and the received phone number are identical to each other.

According to another embodiment, the user identification information may be biometric information such as fingerprints, irises, etc. For example, the image decrypting unit 127 may receive image data (e.g., encrypted image data) that has used biometric information such as fingerprints, irises, etc., as an encryption key, and also biometric information about a user of the electronic device 101 from the user. In that case, the electronic device 101 may display a screen requesting the user's biometric information in order to decrypt the encrypted image data. When the biometric information used as an encryption key is identical to the biometric information input by the user, the image decrypting unit 127 may decrypt the encrypted image data and display the decrypted image data. To this end, the encryption of image data may be performed as follows. The image encrypting unit 125 may map a specific person's biometric information to a corresponding object (e.g., his or her face image, etc.) and store the result in the memory 130. The image encrypting unit 125 may retrieve the biometric information mapped to the object extracted from image data from the memory 130. In addition, the image encrypting unit 125 may encrypt image data through the retrieved biometric information as an encryption key.

When the electronic device 101 ascertains that user identification information of the encrypted image data is identical to the user identification information of the electronic device 101 in operation 1110, it may decrypt the encrypted image data and display the decrypted image data (1115). For example, the image decrypting unit 127 may decrypt the encrypted image data of the electronic device 101 using a hash function, etc.

According to an embodiment, in a state where encrypted image data is encrypted through a phone number of a specific mobile device as an encryption key, when the phone number of the electronic device 101 that has received the encrypted image data is identical to the phone number used for the encryption key, the image decrypting unit 127 may decrypt the encrypted image data to the original image data. In that case, the image decrypting unit 127 may decrypt the encrypted image data through the phone number of the electronic device 101 as an encryption key, transferred from the SIM card 224. The image decrypting unit 127 may control: the memory 130 to store the decrypted image data, or the display 160 to display the decrypted image data.

In contrast, when the electronic device 101 ascertains that user identification information of the encrypted image data is not identical to the user identification information of the electronic device 101 in operation 1110, it may display the encrypted image data (1120). For example, when user identification information of the encrypted image data is not identical to the user identification information of the electronic device 101, the image decrypting unit 127 of the processor 120 does not perform image decryption, and may control the display 160 to display the encrypted image data without decryption.

As described above, since the present disclosure decrypts encrypted image data when the key information about the encrypted image data is identical to the user identification information about the electronic device 101, it can prevent objects included in the image from being disclosed to a third party.

Figure 12A:
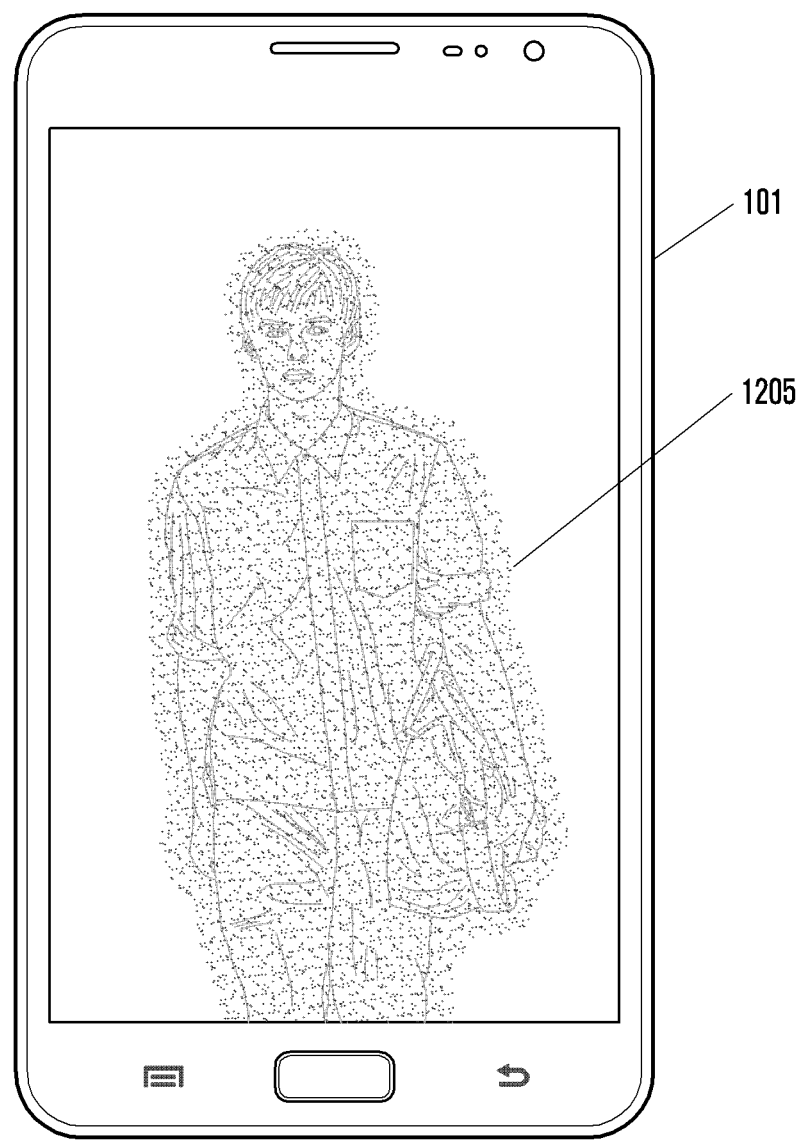
FIG. 12A and FIG. 12B are examples of displaying encrypted image data on the screen, according to the process shown in FIG. 11.
Figure 12B:
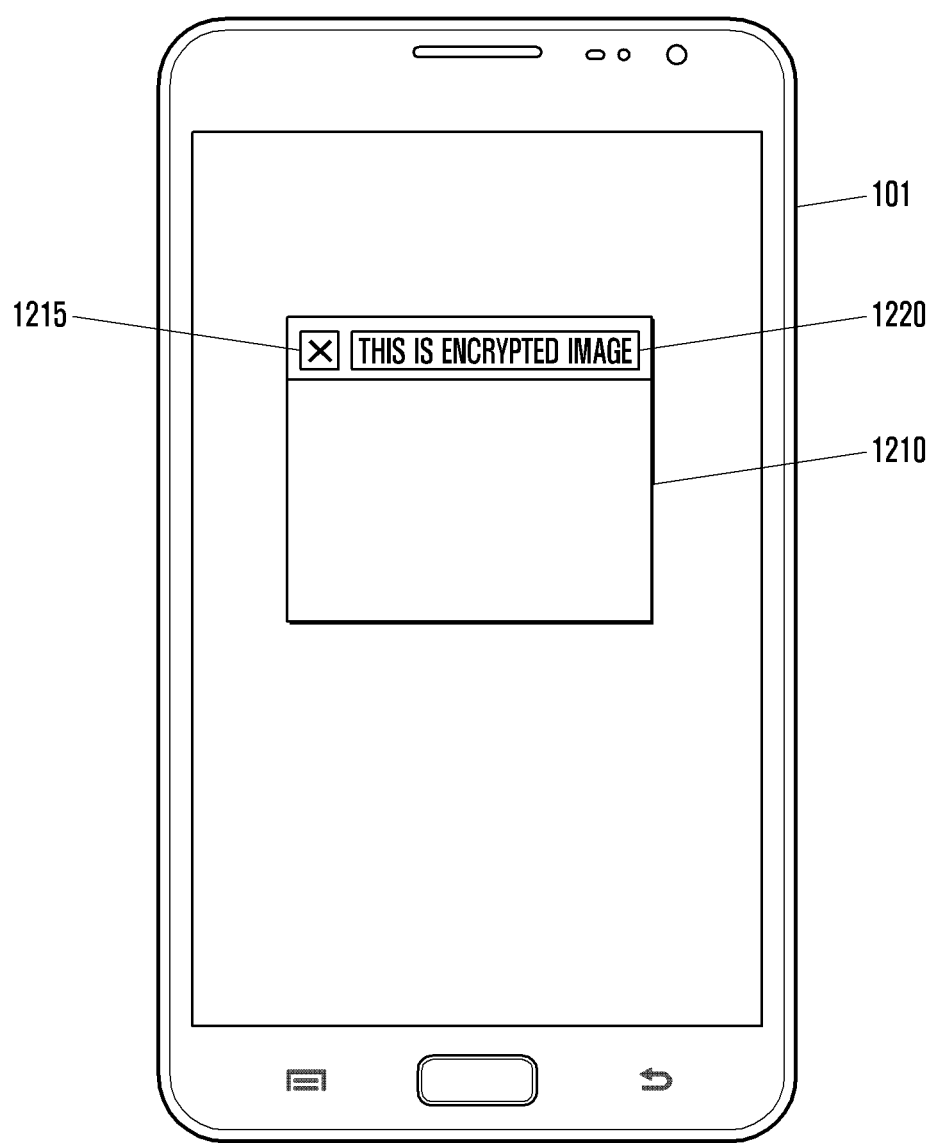

FIGS. 12A and 12B are examples of displaying encrypted image data on the screen, according to the process shown in FIG. 11. When user identification information about the encrypted image data is not identical to the user identification information about the electronic device 101, the electronic device 101 may display the encrypted image data 1205 and 1210, as shown in FIGS. 12A and 12B. More specifically, the encrypted image data 1205 shown in FIG. 12A is created in such a way that the original image data is obfuscated by a mosaic effect, indicating its encrypted status. The encrypted image data 1210 shown in FIG. 12B is encrypted from the original image data so that the original image data is not displayed. For the case shown in FIG. 12B, the electronic device 101 may display a notification window 1220 indicating that the encrypted image data cannot be displayed, along with an "X" icon 1215 selectable to close the window.

Although not shown, when key information about the encrypted image data is identical to the user's identification information about the electronic device 101, the specific image 1005 shown in FIG. 10A may be displayed. In that case, since the specific image 1005 is decrypted from the encrypted image, it may be displayed on the screen without displaying the indicator 1007 and object window 1010.

The method of securing image data and electronic device supporting the method according to an embodiment of the present disclosure may allow electronic device users to encrypt image data so that images including a specific person can be displayed to the person.

In addition, after ascertaining that the user's identification information of an electronic device coincides with an encryption key of encrypted image data, an electronic device of a specific person included in corresponding image data may decrypt and display the encrypted image data. Therefore, electronic device users may prevent images of people from being disclosed regardless of their intent.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), or programmable-logic device, which have been known or are to be developed.

As described above, part of the method (e.g., operations) or system (e.g., modules or functions) according to various embodiments can be implemented with command instructions that can be conducted via various types of computers and stored in computer-readable storage media, as types of programming modules, for example. One or more processors (e.g., processor 120) can execute commend instructions, thereby performing the functions. An example of the computer-readable storage media may be memory 130.

Examples of computer-readable media include: magnetic media, such as hard disks, floppy disks, and magnetic tape; optical media such as CD-ROM disks and DVDs; magneto-optical media, such as floptical disks; and hardware devices that are specially configured to store and perform program instructions (programming modules), such as read-only memory (ROM), random access memory (RAM), flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Modules or programming modules according to various embodiments may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although example embodiments of the disclosure have been described in detail above, it should be understood that many variations and modifications of the basic inventive concept herein described, which may be apparent to those skilled in the art, will still fall within the example embodiments of the disclosure as defined in the appended claims. The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising:
   a display;
   a memory configured to store image data including at least one object, user identification information items, and at least one specific object mapped to each of user identification information items;
   a communication interface communicatively coupled the electronic device to enable network communications with other electronic devices with which the image data are shared or communicated; and
   at least one processor configured to:
   extract an object from the image data,
   identify whether a specific object corresponding to the extracted object exists, wherein the specific object is stored in a phone book or an address book and includes two or more user identification information items,
   if the specific object exists, control the display to display a request for an input selecting one of the two or more user identification information items;
   in response to selecting one of the two or more user identification information items, encrypt the image data using the selected user identification information item as an encryption key, and
   store the encrypted image data in the memory.

2. The electronic device of claim 1, wherein:
   the specific object comprises a facial image stored in the memory and the user identification information items comprises a phone number, and
   the phone number is mapped to the facial image and stored in the memory.

3. The electronic device of claim 1, wherein the at least one processor is further configured to encrypt the image data with a mosaic effect or to cause a message window to be displayed indicating that the image data is not displayable.

4. The electronic device of claim 1, further comprising:
a camera module,
wherein the at least one processor is further configured to capture the image data via the camera module, and store the captured image data in the memory.

5. The electronic device of claim 1, wherein the user identification information item is tagged with exchangeable image file (EXIF) information for the encrypted image data, or stored as metadata of the encrypted image data.

6. The electronic device of claim 5, wherein the user identification information item is processed with security.

7. A method in an electronic device, comprising:
retrieving image data and extracting via a processor an object from the image data;
identifying whether a specific object corresponding to the extracted object exists, wherein the specific object is stored in a phone book or an address book and includes two or more user identification information items;
if the specific object exists, displaying a request for an input selecting one of the two or more user identification information items;
in response to selecting one of the two or more user identification information items, encrypting the image data using the selected user identification information item as an encryption key; and
storing the encrypted image data in a memory.

8. The method of claim 7, wherein:
the specific object comprises a facial image stored in the memory and the user identification information items comprises a phone number, and the phone number is mapped to the facial image and stored in the memory.

9. The method of claim 7, wherein encrypting the image data comprises:
encrypting the image data with a mosaic effect or to cause a message window to be displayed indicating that the image data is not displayable.

10. The method of claim 7, further comprising at least one of the following:
processing the user identification information item with security and tagging the processed user identification information item with exchangeable image file (EXIF) information of the encrypted image data; and
processing the user identification information item with security and storing the processed user identification information item in the encrypted image data as metadata.

* * * * *